US009432200B2

(12) United States Patent
Garcia Martin et al.

(10) Patent No.: US 9,432,200 B2
(45) Date of Patent: Aug. 30, 2016

(54) ANDSF POLICY CONTROLLED ACCESS NETWORK DISCOVERY INFORMATION

(75) Inventors: Miguel-Angel Garcia Martin, Madrid (ES); Pablo Martinez De La Cruz, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 14/239,685

(22) PCT Filed: Aug. 31, 2011

(86) PCT No.: PCT/EP2011/064994
§ 371 (c)(1),
(2), (4) Date: Feb. 19, 2014

(87) PCT Pub. No.: WO2013/029672
PCT Pub. Date: Mar. 7, 2013

(65) Prior Publication Data
US 2014/0160994 A1    Jun. 12, 2014

(51) Int. Cl.
*H04L 12/14* (2006.01)
*H04W 48/16* (2009.01)
*H04W 48/08* (2009.01)
*H04M 15/00* (2006.01)
*H04L 12/24* (2006.01)
(Continued)

(52) U.S. Cl.
CPC ....... *H04L 12/1407* (2013.01); *H04L 41/0893* (2013.01); *H04M 15/66* (2013.01); *H04W 48/08* (2013.01); *H04W 48/16* (2013.01); *H04W 48/14* (2013.01); *H04W 48/18* (2013.01)

(58) Field of Classification Search
None
See application file for complete search history.

(56) References Cited

U.S. PATENT DOCUMENTS

2008/0133727 A1* 6/2008 Belqasmi ............ H04L 41/0226
709/223
2012/0264412 A1* 10/2012 Tervonen .............. H04W 48/08
455/418

FOREIGN PATENT DOCUMENTS

WO    2009127238 A1    10/2009

OTHER PUBLICATIONS

International Search Report and Written Opinion dated Apr. 4, 2012 for International Application No. PCT/EP2011/064994, International Filing Date: Aug. 31, 2011 consisting of 11-pages.
(Continued)

*Primary Examiner* — Dang Ton
*Assistant Examiner* — Ronald H Davis
(74) *Attorney, Agent, or Firm* — Christopher & Weisberg, P.A.

(57) ABSTRACT

A system for generating by an Access Network Discovery and Selection Function, ANDSF, access network discovery information, ANDI, for transmission to a User Equipment, UE, of a network subscriber. The system includes an ANDI repository storing, for each of a plurality of access networks, an ANDI data entry having ANDI for the respective access network. An ANDI generating policy repository stores a plurality of ANDI generating policies. An association component is configured to associate each of a plurality of network subscriber identifiers with at least one of the ANDI generating policies. An identification component is configured to identify the at least one ANDI generating policy corresponding to a network subscriber identifier associated with the UE. An ANDSF component is configured to apply the at least one identified policy to the ANDI data entries stored in the ANDI repository to generate the ANDI for transmission to the UE.

18 Claims, 9 Drawing Sheets

(51) Int. Cl.
H04W 48/18 (2009.01)
H04W 48/14 (2009.01)

(56) References Cited

OTHER PUBLICATIONS

NPL-D5-Marius Corici et al.: "Access Network Discovery and Selection in the Future Broadband Wireless Environment", , Jan. 1, 2010, pp. 1-27, XP55014749, Berlin, Germany Retrieved from the Internet: URL:http://www.mobilware.org/2010/presenta tions/Access Network Discovery.pdf [retrieved on Dec. 13, 2011] consisting of 4-pages.

NPL-D2-Marius Corici et al.: "Enhanced access network discovery and selection in 3GPP Evolved Packet Core", Local Computer Networks, 2009. LCN 2009. IEEE 34th Conference on, IEEE, Piscataway, NJ, USA, Oct. 20, 2009, pp. 677-682, XP031581399, ISBN: 978-1-4244-4488-5 consisting of 6-pages.

Qiang Duan: "Applying the Service-Oriented Architecture for Network Discovery and Selection in the Next Generation Wireless Mobile Networks", Network-Based Information Systems, 2009. NBIS '09. International Conference on, IEEE, Piscataway, NJ, USA, Aug. 19, 2009, pp. 380-385, XP031578062, ISBN: 978-1-4244-4746-6 consisting of 4-pages.

Inoue et al. —"MIRAI: A Solution to Seamless Access in Heterogeneous Wireless Networks", , May 11, 2003, XP55014760, Retrieved from the Internet: URL:http://www2.nict.go.jp/w/w122/old/mt/b193/member/inoue/ICC03-Inoue.pdf [retrieved on Dec. 13, 2011] consisting of 6-pages.

NPL-D1-Research in Motion, et al.: "Access Network Discovery and Selection in IFOM", 3GPP Draft; S2-101396, 3rd Generation Partnership Project (3GPP), Mobile Competence Centre ; 650, Route Des Lucioles ; F-06921 Sophia-Antipolis Cedex ; France, vol. SA WG2, No. San Francisco, USA; 20100222, Feb. 16, 2010, XP050433912, [retrieved on Feb. 16, 2010] consisting of 28-pages.

3GPP TS 24.312 V10.3.0 (Jun. 2011), 3rd Generation Partnership Project; Technical Specification Group Core Network and Terminals; Access Network Discovery and Selection Function (ANDSF) Management Object (MO) (Release 10), Jun. 2011, consisting of 155-pages.

3GPP TS 23.203 V11.2.0 (Jun. 2011), 3rd Generation Partnership Project; Technical Specification Group Services and System Aspects; Policy and charging control architecture (Release 11), Jun. 2011, consisting of 142-pages.

3GPP TS 23.402 V10.4.0 (Jun. 2011), 3rd Generation Partnership Project; Technical Specification Group Services and System Aspects; Architecture enhancements for non-3GPP accesses (Release 10), Jun. 2011, consisting of 231-pages.

1st Examination Report of the European Patent Office dated Mar. 6, 2015 for European Application No. 11 752 193.0-1853, EP Filing Date: Feb. 19, 2014 consisting of 8-pages.

NPL-D6-Rebecca Copeland et al.: "Policies to Enable Serving Untrusted Services on Alternative (Non-3GPP) and Untrusted Access Networks in EPS", Computer Software and Applications Conference Workshops (COMPSACW), 2011 IEEE 35th Annual, IEEE, Jul. 18, 2011, pp. 48-53, XP031972098, DOI: 10.1109/COMPSACW.2011.19 ISBN: 978-1-4577-0980-7 consisting of 6-pages.

* cited by examiner

ANDSF POLICY CONTROLLED ACCESS NETWORK DISCOVERY INFORMATION

TECHNICAL FIELD

The present invention generally relates to the Evolved Packet Core (EPC) of the System Architecture Evolution (SAE) for mobile communication networks, and specifically to the generation, by an Access Network Discovery Function (ANDSF) of the EPC, of access network discovery information for transmission to a User Equipment (UE).

BACKGROUND

The Access Network Discovery and Selection Function is an entity introduced by 3GPP as part of their Release 8 set of specifications, within an Evolved Packet Core of the System Architecture Evolution for 3GPP-compliant mobile networks. The purpose of the ANDSF is to assist a UE to discover non-3GPP access networks, such as WLAN or WIMAX, that can be used for data communications in addition to 3GPP access networks (such as HSPA or LTE) and to provide the UE with rules policing the connection to these networks. The ANDSF is described, for example, in Chapter 4.8 of the 3GPP Specification TS 23.402, v.10.4.0, Release 10 (June 2011). For convenience, an overview of the key features of the ANDSF is provided in the following.

An ANDSF provides one or more of the following kinds of information to a UE, based on operator configuration:
(1) Inter-System Mobility Policy (ISMP), comprising a set of operator-defined network selections rules for a UE with no more than one active access network connection (for example, either LTE or WLAN); in other words, a UE that can route IP traffic only over a single radio access interface at a given time. The ISMP can be used by the UE to determine when inter-system mobility is allowed or restricted (e.g. from one access technology type to another, such as a handover from WLAN to WiMAX, or when certain conditions are met). The ISMP can also identify which technology type or which access network is most preferable for accessing the EPC, for example, if a specific access technology type is preferable to another (e.g. WiMAX is preferable to WLAN) or if a specific access network identifier is preferable to another (e.g. WLAN SSID-1 is preferable to WLAN SSID-2);
(2) Inter-System Routing Policy (ISRP), comprising network selection rules for a UE with potentially more than one active access network connection (e.g. both LTE and WLAN). Such a UE may employ IP Flow Mobility (IFOM), Multiple Access PDN Connectivity (MAPCON) or non-seamless WLAN offload according to operator policy and user preferences; and
(3) Access Network Discovery Information (ANDI), comprising a list of networks that may be available in the vicinity of the UE, for all access technology types requested by the UE (if any are requested) and information assisting the UE to expedite the connection to these networks. The ANDI identifies the access technology type of an available access network (e.g. WLAN or WiMAX), the radio access network identifier (e.g. the SSID of a WLAN), as well as other technology-specific information, such as one or more carrier frequencies which the UE is to use. The ANDSF is able to limit the amount of ANDI provided to the UP based on the UE's geographical location and its technological capabilities, i.e. the access technology types with which it is compatible.

The ANDSF communicates with the UE over the S14 reference point, which is essentially a synchronization of an OMA-DM Management Object (MO) specific to ANDSF. Details of the ANDSF MO are disclosed in 3GPP Specification TS 24.312, v.10.3.0, Release 10 (June 2011).

A shortcoming of existing ANDSF implementations is that they are not optimised with respect to the delay that occurs between the transmission of ANDI being triggered (either by the ANDSF receiving a request from the UE or by the transmission being triggered by a network event) and the consequent implementation of procedures by the UE to discover and reselect a higher-priority access network where the received ANDI indicates that such an access network is available in the vicinity of the UE. It is therefore highly desirable to find a way of reducing this delay.

SUMMARY

The present inventors have realized that the above and other shortcomings of known ANDSF implementations can be overcome by firstly modifying the way ANDI data entries are stored in a data repository (e.g. a database implemented on suitable hardware) that is used by the ANDSF.

Standardization has focused on the definition of the S14 interface, leaving unspecified the details of how the ANDI used by the ADNSF is stored. An ANDSF server implementing the ANDSF uses or includes a database storing a potentially huge set of ANDI data entries, each entry representing information about a given access network of a given technology type for a given location area.

When the ANDSF server receives a request from a UE, it typically uses an indication of the access technology type which the UE is compatible with together with location information provided by the UE to select a subset of all the available ANDI data entries, including in the selection those entries relating to compatible access networks which fall within the boundaries of the location area reported by the UE. This implies that two roughly similar UEs, in the same rough geographical area, at roughly the same time, sending a request to the ANDSF server will get the same ANDI from the ANDSF server.

A problem with this approach is that, in order to limit the amount of ANDI that is transmitted by the ANDSF for practical reasons, the data sent by the ANDSF server contains a reduced set of data, filtered from all the data provisioned in the ANDSF database. This sent data is related to the current geographical position of the UE, which can be regarded as a "least common multiple" set of data; that is, the smallest set of data which is useable by all possible ANDSF clients that are located in the same geographical area. If a set containing more data than this "least common multiple set" is provisioned, some UEs will get ANDI that is irrelevant to them or not useable by them. On the other hand, this "least common multiple" approach can lead to some ANDSF clients missing valuable ANDI.

A system for generating by an ANDSF access network discovery information for transmission to a UE of a network subscriber according to an embodiment of the present invention comprises an ANDI repository storing for each of a plurality of access networks an ANDI data entry comprising ANDI for the respective access network. Each of the ANDI data entries are stored in association not only with an access technology type identifier identifying an access technology type of the respective access network and a location identifier associated with a location of the respective access network, but also an access network group identifier identifying a group of a plurality of groups of one or more access networks, to which group the respective access network belongs.

For instance, each group of access networks may comprise one or more access networks to which a particular set of network subscribers are granted access. As an example, there may be a first group of access networks, e.g. to which access is granted to all network subscribers (hereinafter referred as "public access networks") and one or more groups of second access networks, e.g. to which access is granted only to a subset of all network subscribers (hereinafter referred as "non-public access networks"). In this case, for each group of access networks, the set of network subscribers granted access to the one or more access networks in that group may be determined according to a network subscriber-based criterion that differs from a network subscriber-based criterion used to determine the set of network subscribers that are granted access to the one or more access networks in any other of the groups of access networks.

The criterion for granting access to a group of one or more public access networks may, for example, be that the network subscriber is member of the public, while the criterion for granting access to a group of one or more non-public access networks might be that the network subscriber is a member of a selected subset of all subscribers, such as the authorized subscribers of a network service provider, users authorized by a corporate body or members of a household.

Thus, in a scenario where one subset of users are authorized to use a group of private access networks (such as given corporate networks or a private ADSL/WLAN access network), the access network group identifier may be used to identify the ANDI data entries in the ANDI repository relating to such non-public networks and thereby allow the ANDSF to send more complete ANDI relating only to those access networks to the authorized users, thereby avoiding the transmission of ANDI that is not relevant to them or useable by them, and thus the associated transmission delay.

To allow the ANDSF server to generate the ANDI for transmission to a UE, the system of the embodiment further comprises a Subscription Profile Repository, SPR, including an ANDI generating policy repository storing a plurality of ANDI generating policies, each of these policies identifying at least one of the groups of access networks that are to be used to generate, from the ANDI data entries in the ANDI repository, the ANDI for transmission to the UE. To allow one or more ANDI generating policies to be obtained for a given network subscriber, the system also includes a Policy and Charging Rules Function, PCRF, component including an association component to associate each of a plurality of network subscriber identifiers with at least one of the ANDI generating policies stored in the ANDI generating policy repository, and an identification component arranged to identify at least one ANDI generating policy corresponding to a network subscriber identifier that is associated with the UE. The PCRF component is configured to retrieve the at least one identified ANDI generating policy from the ANDI generating policy repository in the SPR. An ANDSF component of the system is configured to apply the at least one retrieved ANDI generating policy to the ANDI data entries stored in the ANDI repository to generate the ANDI for transmission to the UE.

Thus, it will be appreciated that the present invention provides in one aspect a system for generating ANDI by an ANDSF for transmission to a UE of a network subscriber. The system comprises an ANDI repository storing for each of a plurality of access networks an ANDI data entry comprising ANDI for the respective access network. Each of the ANDI data entries is stored in association with: an access technology type identifier identifying an access technology type of the respective access network; a location identifier associated with a location of the respective access network; and an access network group identifier identifying a group of a plurality of groups of one or more access networks, to which group the respective access network belongs. The system also includes a Subscription Profile Repository, SPR, comprising an ANDI generating policy repository storing a plurality of ANDI generating policies, each said policy identifying at least one of the groups of access networks for use in generating, from the ANDI data entries in the ANDI repository, the ANDI for transmission to the UE. The system further comprises a Policy Charging Rules Function, PCRF, component including an association component configured to associate each of a plurality of network subscriber identifiers with at least one of the ANDI generating policies stored in the ANDI generating policy repository, and an identification component configured to identify the at least one ANDI generating policy corresponding to a network subscriber identifier associated with the UE. The PCRF component is configured to retrieve the at least one identified ANDI generating policy from the ANDI generating policy repository in the SPR. The system also has an ANDSF component to apply the at least one retrieved ANDI generating policy to the ANDI data entries stored in the ANDI repository to generate the ANDI for transmission to the UE.

According to another aspect, the present invention provides a method of generating by an ANDSF access network discovery information for transmission to a UE of a network subscriber. The method comprises storing in an ANDI repository for each of a plurality of access networks an ANDI data entry comprising ANDI for the respective access network. Each of the ANDI data entries is stored in association with: an access technology type identifier identifying an access technology type of the respective access network; a location identifier associated with a location of the respective access network; and an access network group identifier identifying a group of a plurality of groups of one or more access networks, to which group the respective access network belongs. According to the method, a plurality of ANDI generating policies are stored in a Subscription Profile Repository, SPR, each said policy identifying at least one of the groups of access networks to be used in generating, from the ANDI data entries in the ANDI repository, the ANDI for transmission to the UE. Each of a plurality of network subscriber identifiers is associated, by a Policy and Charging Rules Function, PCRF, with at least one of the ANDI generating policies stored in the SPR, and the at least one ANDI generating policy corresponding to a network subscriber identifier associated with the UE is identified by the PCRF. The PCRF retrieves the at least one identified ANDI generating policy from the SPR. The method further comprises the ANDSF applying the at least one retrieved ANDI generating policy to the ANDI data entries stored in the ANDI repository to generate the ANDI for transmission to the UE.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

The system described in the embodiments herein, as well as the methods described herein with regard to the apparatuses making up said system, allow composing a user-specific ANDI projection with regard to an UE of a user in a certain location, so that the ANDI transmitted from an ANDSF to an UE of a user placed on a certain location comprises only information about the access network(s)—among the plurality of access network available to said UE in said location—which access can be granted to the UE. Therefore, as long as an UE uses the ANDI information received from an ANDSF, the UE will not spend communication and processing resources trying to connect to access networks on its vicinity that are not allowed, thereby also saving communication and processing resources of the access networks on its vicinity.

[First Embodiment]

A first embodiment of the present invention, which is helpful for explaining the key concepts behind the present invention as well as certain optional features, will now be described with reference to FIGS. 1 to 4.

Figure 1:
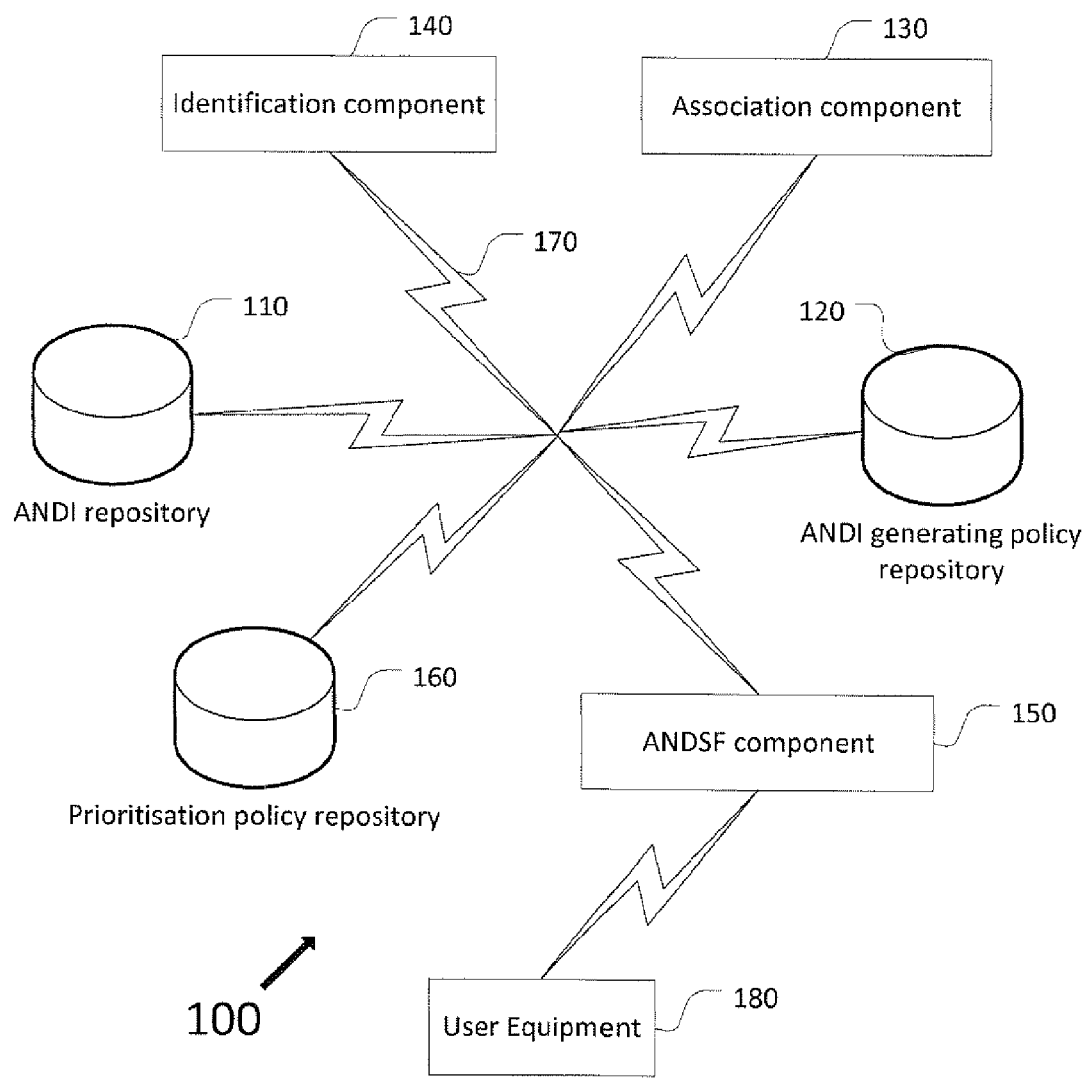
FIG. 1 shows a system for generating ANDI according to a first embodiment of the present invention.

FIG. 1 shows a system 100 for generating ANDI according to a first embodiment of the present invention, which comprises an ANDI repository 110, an ANDI generating policy repository 120, an association component 130, an identification component 140, and ANDSF component 150, and an optional prioritisation policy repository 160.

In FIG. 1, the ANDI repository 110, the ANDI generating policy repository 120 and the prioritisation policy repository 160 are shown as separate data repositories, although a single data repository, such as a database implemented in appropriate hardware (e.g. a server connected to a data storage device) and configured in accordance with techniques known to those skilled in the art, could comprise one or more of the ANDI repository 110, the ANDI generating policy repository 120 and the prioritisation policy repository 160.

The association component 130, identification component 140, and ANDSF component 150 shown in FIG. 1 are hardware components of the system 100 that are functionally connected to one another and to the ANDI repository 110, ANDI generating policy repository 120 and the prioritisation policy repository 160 by any suitable connection (such as a network or bus), as illustrated at 170 in FIG. 1. Each of these components may be realised by suitably programmed signal processing apparatus such as a server, which implements procedures that may form at least a part of a computer program, module, object or sequence of instructions executable thereby. These procedures, when executed by the respective signal processing hardware, cause the components of the system shown in FIG. 1 to interact in the manner described below to generate subscriber-specific ANDI, which is then transmitted by the ANDSF component 150 to a UE 180 of the network subscriber. The functions of each of the components of the system 100 shown in FIG. 1 will now be explained.

The ANTI repository 110 stores, for each of a plurality of access networks, an ANDI data entry containing ANDI for the respective access network. The ANDI data entry can be regarded as a container for information about a given access network, which has a given set of characteristics and a given location area. For instance, an ANDI data entry may contain information of an access network (including various network characteristics, such as frequency of operation, bandwidth, etc.), a network identifier (usually known as the SSID, which may be named "SSID1", for example) and an indication that the particular access network uses WLAN radio technology, for example.

Thus, each of the ANDI data entries in the ANDI repository 110 is stored in association with an access technology type identifier identifying an access technology type of the respective access network, and a location identifier associated with a location of the respective access network. The location identifier could, for example, provide an indication of a coverage area of an access network in terms of the coordinates of a repeat unit of a location grid according to which a geographical area is partitioned.

In addition, each ANDI data entry in the ANDI repository 110 is stored in association with an access network group identifier (ANG-ID), which uniquely identifies a group of a plurality of groups of one or more access networks, to which group the access network described by the ANDI data entry belongs.

The access networks are grouped into groups having one or more access networks, according to criteria that are left up to the operator or the organization operating the ANDSF service. In the present embodiment, each group of access networks comprises one or more access networks to which a set of network subscribers (being subscribers to a service that is provided over a 3GPP-compliant mobile network) are granted access.

More specifically, the groups include a group of public access networks, i.e. access networks for which access is granted to all network users, and a group of non-public access networks, to which access is granted only to a subset of all network users. Further, for each group of access networks, the set of network subscribers granted access to the access networks in that group are determined according to a network subscriber-based criterion that differs from a network subscriber-based criterion used to determine the set of network subscribers that are granted access to the access networks in any other of the groups of access networks.

In the present embodiment, the criterion for granting access to a group of public access networks is that the network subscriber is member of the public, while the criterion for granting access to a group of non-public access networks is, in the present embodiment, that the network subscriber is a member of a selected subset of all subscribers, namely authorised subscribers of a network service provider, users authorised by a corporate body or members of a household.

Figure 3:
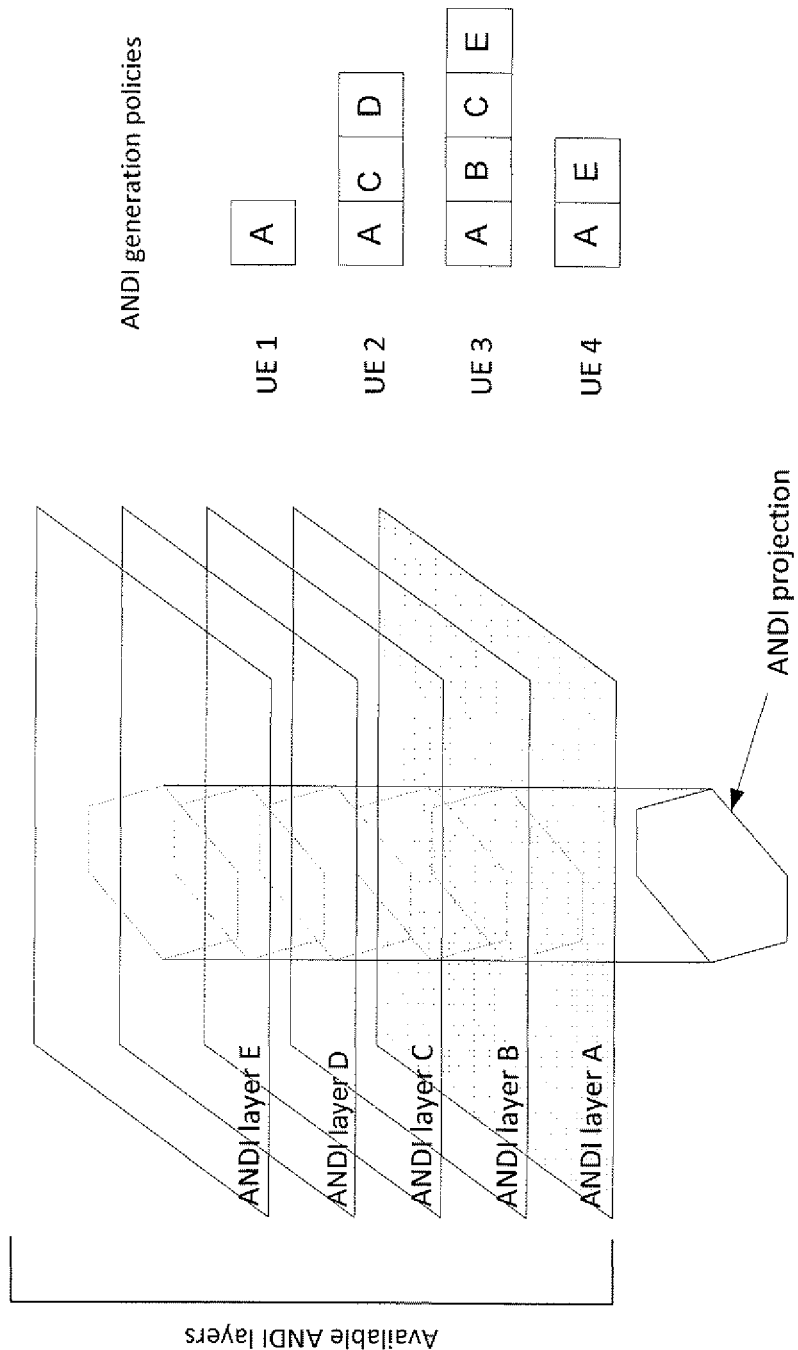
FIG. 3 is a schematic illustrating the grouping of data in the ANDI repository into layers, examples of ANDI generation policies, and how these relate to the ANDI projection.

For reasons which will become clear from the following description, it is helpful to visualise the ANDI data entries in the ANDI repository as being distributed among a number of "layers" (five are illustrated in FIG. 3, which is described further in the following), with each layer containing a set of ANDI entries that share the same ANG-ID.

Thus, the data in the ANDI repository 110 can be regarded as being divided up into a number of layers, including, for example:
- a public ANDI layer, comprising ANDI data entries relating to access networks whose access is granted to any user;
- one or more service provider ANDI layers, comprising ANDI data entries relating to access networks whose access is granted to only duly authorized subscribers, such as those who have a contract with the service provider;
- one or more corporate ANDI layers, comprising ANDI data entries relating to access networks whose access is granted to only duly authorized employees of the hosting corporation or members of a given group; and
- one or more private ANDI layers, comprising ANDI data entries relating to access networks whose access is granted to only a small reduced number of users, typically members of a household.

An ANDSF operator could, for example, define one corporate ANDI layer to provision access points relative to WLAN hotspots in the corporate headquarters and the different offices of a given corporation, identifying it with an access network group identifier (ANG-ID) "CORP_1". A public ANDI layer is defined to provision data of one or more access networks to be used in best-effort mode, using an ANG-ID "DEFAULT". A service provider ANDI layer can be provisioned with information of a one or more access networks deployed by the service provider with special characteristics reserved for privileged users, identified by an ANG-ID "PREMIUM". Furthermore, a private ANDI layer can contain ANDI for those users who belonging to the same household or family, who access the network through a WLAN access point, identified by an ANG-ID "WLAN_PRIVATE", and so on.

Figure 2:
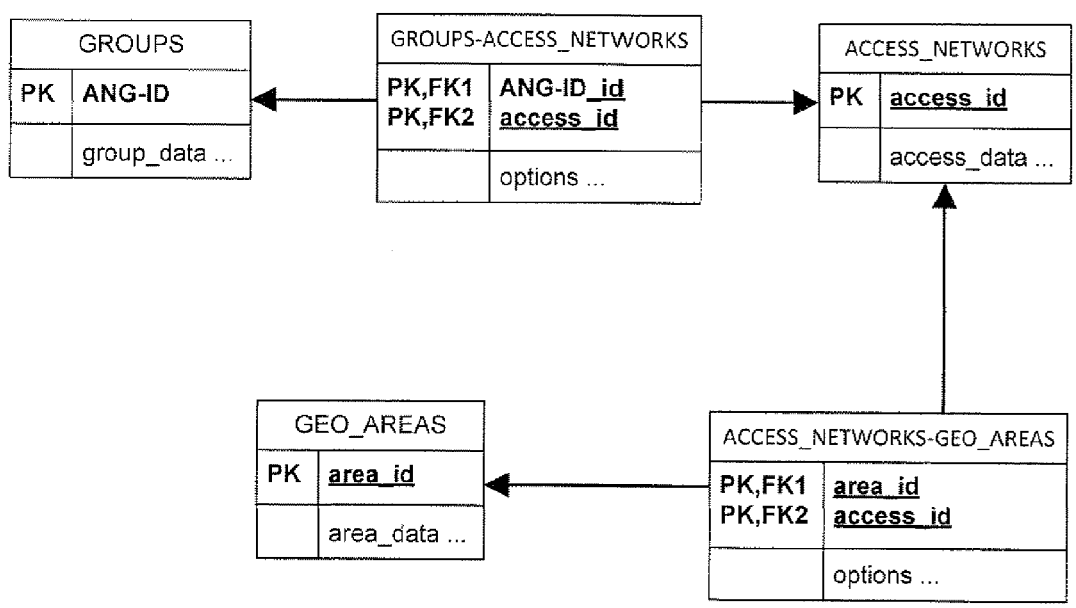
FIG. 2 illustrates the modelling of ANDI groups in a relational database.

An exemplary reference implementation of the access network layers concept, which uses relational databases and SQL as the persistence and querying technology, will now be described with reference to FIG. 2. The entity-relationship diagram of FIG. 2 illustrates a sample relational modelling.

The table "GROUPS" holds all the different groups according to which ANDI data entries defined in the ANDI repository 110 are classified. The ANG-ID is the primary key (PK, "ANG-ID"). As FIG. 2 shows, there are additional fields ("group_data") that are used to hold implementation data that are specific to the group. Samples of the ANG-ID values are the previously mentioned "PREMIUM", "CORP 1", etc.

The "ACCESS_NETWORKS" table holds information relating to all the different access networks known to the ANDI repository 110. Access networks are identified by the "access_id", which is the primary key. There are additional fields ("access_data"), which are used to characterise the access network (e.g. SSIDs).

The "GROUPS-ACCESS_NETWORKS" table is used to relate together the access networks and ANG-IDs in a many-to-many relationship. That is, a group comprises one or more access networks and, at the same time, an access network can belong to one or more groups (or none of the groups).

The "GEO_AREAS" table defines all the geographical areas known to the ANDI repository 110. Geographical areas are identified by the area id, which is the primary key. As FIG. 2 also shows, there are additional fields (area_data) that are used to characterise the access networks (geographical bounds and such).

The "ACCESS_NETWORKS-GEO_AREAS" table is used to relate together the access networks and geographical areas in a many-to-many relationship. That is, an access network can span across one or more geographical areas and, at the same time, a geographical area can be serviced by none, one or more access networks.

It is possible for the ANDSF component 150 to fetch from the ANDI repository 110 ANDI data entries belonging to one or more ANDI layers identified by ANDI group identifiers ang-id1, ang-id2 and ang-id3, using a SQL query similar to this:

SELECT L.GROUP_DATA GROUP_DATA, A.ACCESS_DATA ACCESS_DATA FROM GROUPS L, ACCESS_NETWORKS A, GROUPS-ACCESS_NETWORKS LA
WHERE L.ANG-ID=LA.ANG-ID AND
A.ACCESS_ID=LA ACCESS_ID AND
L.ANG-ID IN (ang-id1, ang-id2, ang-id3)

Referring again to FIG. 1, the ANDI generating policy repository 120 stores a plurality of ANDI generating policies. As explained below, the ANDI generating policies can either be requested by the ANDSF component 150 or pushed to it as a result of the different interactions with the ANDI generating policy repository 120.

Each of these policies identifies one or more of the groups of access networks that are to be used to generate, from the ANDI data entries in the ANDI repository 110, the ANDI for transmission to the UE 180. An ANDI generating policy comprises at least one ANG-ID that is to be used to unequivocally identify those one or more ANDI data items in the ANDI data repository 110 that are to be used to generate the ANDI for transmission to the UE 180. An ANDI generating policy may simply consist of one or more such identifiers or, as in the present embodiment, comprise a set of one or more instructions that require the processing of the at least one ANG-ID in order to generate a user-specific "ANDI projection", which comprises ANDI only from ANDI data entries that are associated with the at least one ANG-ID in an ANDI generating policy that, in turn, is associated with the user of the UE 180, as well as a location identifier that corresponds to the location of the UE 180 to which the ANDI is to be transmitted. In other words, in the present embodiment, the instructions indicate how to aggregate and filter data entries in the ANDI repository in order to compose a user-specific ANDI projection with regard to an UE of a user in a certain location, so that the ANDI transmitted to the UE only comprises information about the access networks—among the plurality of access network available to said UE in said location—that can be accessed by the UE. For example, for a given user, the instructions in the repository may indicate:

ANDI projection=ANG-ID DEFAULT+ANG-ID
        CORP_1+ANG-ID WLAN_PRIVATE–ANG-ID
        GOV_3

The above instructions indicate that the ANDI projection for the particular user is composed by aggregating the information (for a given location area) which is contained in the ANDI layers whose identifiers are DEFAULT, CORP_1, WLAN_PRIVATE, and removing from this the information from data entries that are identified by identifier GOV_3.

FIG. 3 illustrates examples of the different ANDI generation policies that a number of users can have. In particular, FIG. 3 illustrates how, depending on the different ANDI generation policies applicable to a user of a UE, the ANDSF component 150 includes one or more ANDI layers into an ANDI projection, bounded to a certain location area. These policies determine, for instance, that for UE 2, ANDI layers A, C, and D must be selected when creating the ANDI projection. Methods of projecting data into a single view are well known, for example in the field of database technology, such that a detailed explanation of such methods is not necessary here.

As noted above, in the present embodiment, the ANDI generating policies are defined on a per UE-user basis. The association between each of a plurality of network subscriber identifiers (such as MSISDNs) and at least one of the ANDI generating policies stored in the ANTI generating policy repository is provided by the association component 130.

The identification component 140 shown in FIG. 1 serves to identify the at least one ANTI generating policy corresponding to a network subscriber identifier associated with the UE 180, while the ANDSF component 150 is arranged to apply the at least one identified policy to the ANTI data entries stored in the ANTI repository 110 to generate the ANTI for transmission to the UT 180.

Finally in connection with FIG. 1, the prioritisation policy repository 160, which optionally forms part of the system 100, stores a plurality of prioritisation policies for use by the ANDSF component 150 to determine an order in which the UT 180 is to attempt connection to access networks identified in the generated ANDI when the ANDSF component 150 generates at least one of an ISMP and an ISRP for transmission to the UE 180. For instance, a prioritisation policy may dictate that WLAN ANTI data available in the ANDI projection should be given higher priority in the ANDSF component response than ANDI data related to 3G access networks.

The operation of the system 100 of the present embodiment will now be described with reference to FIGS. 4 and 5.

Figure 4:
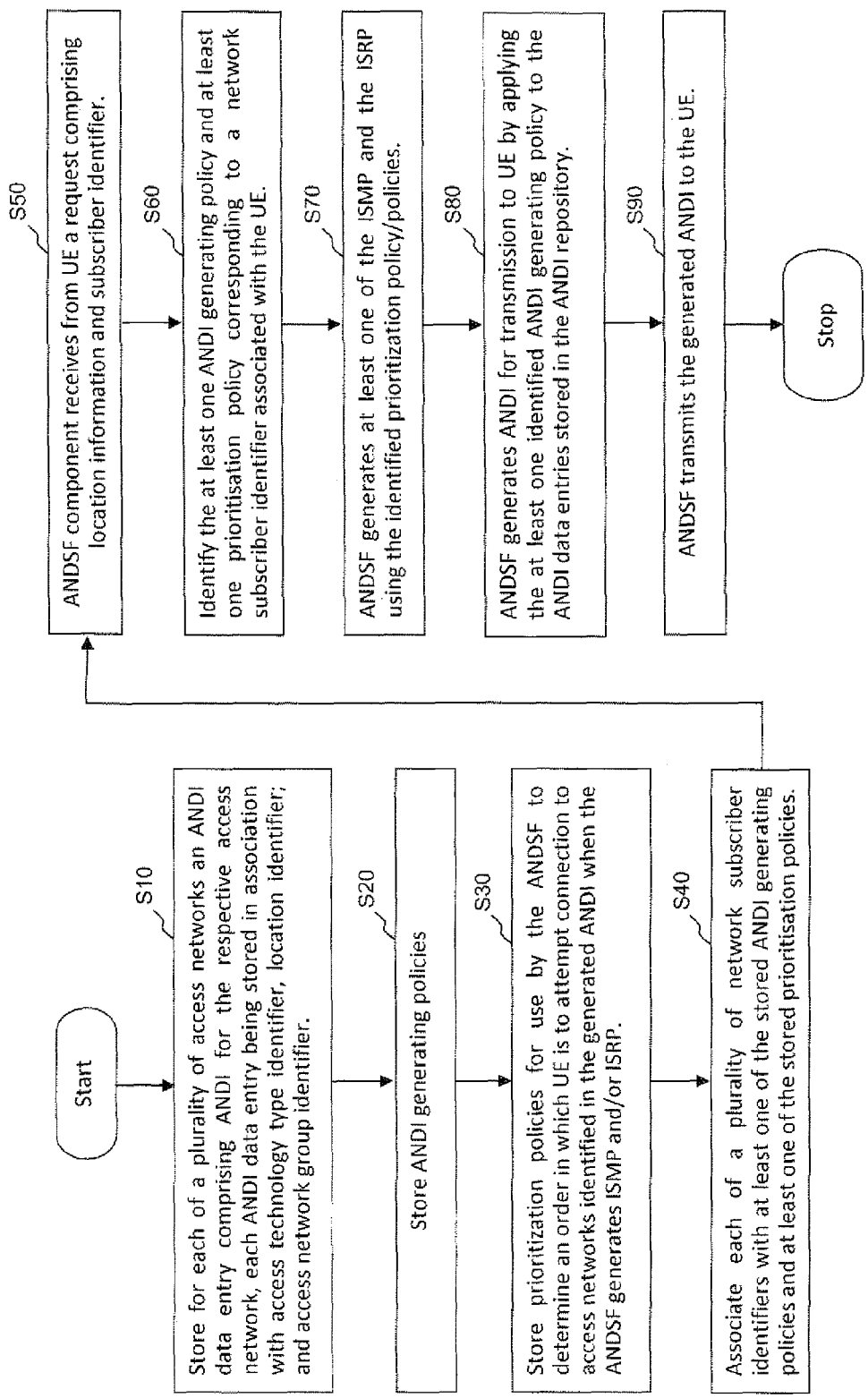
FIG. 4 is a flow chart illustrating the operation of the system shown in FIG. 1 to generate ANDI for transmission to a User Equipment.

FIG. 4 is a flow chart illustrating the operation of system 100 to generate ANDI for transmission to the UE 180.

First, in step S10, for each of a plurality of access networks, an ANDI data entry comprising ANDI for the respective access network is stored in the ANDI repository 110. As noted above, each of the ANDI data entries is stored in association with an access technology type identifier identifying an access technology type of the respective access network; a location identifier associated with a location of the respective access network; and an access network group identifier identifying a group of a plurality of groups of access networks, to which group the respective access network belongs.

In step S20, a plurality of ANDI generating policies of the kind described above are stored in the ANDI generating policy repository 120.

In step S30, a plurality of prioritisation policies, for use by the ANDSF component 150 to determine an order in which the GE 180 is to attempt connection to access networks identified in the generated ANDI when the ANDSF component 150 generates an ISMP for transmission to the UE 180, are stored in the prioritisation policy repository 160. The prioritisation policies can either fetched by the ANDSF component 150 from the prioritisation policy repository 160, or pushed from the prioritisation policy repository 160 to the ANDSF component 150 under a specific scenario described later. These prioritisation policies are defined on a per UE user basis.

In step S40, each of a plurality of network subscriber identifiers is associated in the association component 130 with at least one of the ANDI generating policies stored in the ANDI generating policy repository 120 and at least one of the prioritisation policies stored in the prioritisation policy repository 160. Where more than one ANDI generating policy or prioritisation policy is associated with a particular subscriber identifier, these policies may be distinguished according to any available additional information relating to the UE 180, such as its activity level. Thus, for a given subscriber identifier, there may be one prioritisation policy which is to used to generate an ISMP when the UE 180 reports in its request for ANDI that it is in a pre-defined "active" state, and another prioritisation policy which is to used to generate an ISMP when the UT 180 reports that it is in a pre-defined "idle" state.

In step S50, the ANDSF component 150 receives from the UE 180 a request for ANDI. The request comprises location information identifying the location area of the UE 180, as well as a subscriber identifier which identifies the network subscriber currently using the UE 180. In the present embodiment, the ANDSF component 150 is able to identify the user by the International Mobile Equipment Identity (IMEI), which is received as part of an OMA DM request. The request may also include other information, such as whether the UE 180 is in an active state or an idle state, as noted above.

In step S60, at least one ANDI generating policy and at least one prioritisation policy each corresponding to the received network subscriber identifier are identified by identification component 140. In the present embodiment, the policy repositories implement the logic of the identification component 140 to select a set of the aforementioned polices which are suitable for the user for whom the policies are being requested. Furthermore, in the present embodiment, the activity status reported by the UE 180 is additionally used by the identification component 140 to identify a single ANDI generating policy and a single prioritisation policy corresponding to the received network subscriber identifier.

The ANDSF component 150 then retrieves the identified ANDI generating policy from the ANDI generating policy repository 120 and the identified prioritisation policy from the prioritisation policy repository 160. Such retrieval of policies is accomplished by means of a high-level operation, namely Request policies operation, comprising a request message and a response message.

In step S70, the ANDSF component 150 generates an ISMP, taking into account the identified prioritisation policy. The ANDSF component 150 uses the prioritisation policy to determine an order in which the UE 180 is to attempt connection to access networks identified in the generated ANDI when it generates the ISMP. For example, the prioritisation policy may indicate that connection to WLAN access networks is to take priority over connection to other kinds of access network. The ANDSF component may use this information to select one of a number of ISMPs in a database accessible by the ANDSF component 150, which reflects this priority.

Then, in step S80, the ANDSF component 150 applies the identified ANDI generating policy to the ANDI data entries stored in the ANDI repository 110 to generate an ANDI projection comprising ANDI for transmission to the UE 180. This can be done in one of a number of ways. In the present embodiment, the ANDSF component 150 filters the location area-specific ANDI, which has been retrieved from the ANDI repository 110 as part of the conventional ANDSF operation (using the location information provided by the NE 180), according to the one or more access network groups/layers that are identified in the ANDI generating policy. Alternatively, the user-specific ANDI projection could be obtained by formulating a more focussed query that allows only the required information to be retrieved from the ANDI repository; namely a query which stipulates the one or more ANG-IDs that the data entries whose content is to be retrieved must have.

Thus, in the context of the illustration in FIG. 3, the ANDSF component 150 can be considered to enforce the ANDI layer selection policies by selecting the ANDI layers using the ANDI generation policy, which has been received from the ANDI generating policy repository 120. Furthermore, the ANDSF component 150 filters the resulting access network discovery information data by selecting only the data which is bounded to the location area that the UE 180 has reported. The resulting (area-filtered) access network information layers make up the ANDI projection.

Finally, in step S90, the ANDSF component 150 translates the prioritised ANDI projection, comprising the generated ANDI and the ISMP, into an ANDSF MO document and transmits this to the UE 180. The UE 180 and the ANDSF component 150 may interact via a non-seamless WLAN offload or via any 3GPP or non-3GPP access technology that can be used by the UE to access the EPC.

As a result, the UE 180 will receive ANDI from the ANDSF which relates only a subset of all the available access networks in the vicinity of the UE 180 that might be contacted by it (i.e. at least according to the communication capabilities of the UE) but which are filtered (i.e. barred or allowed) depending on the applicable one or more groups that are identified in the identified ANDI generating policy.

Figure 5:
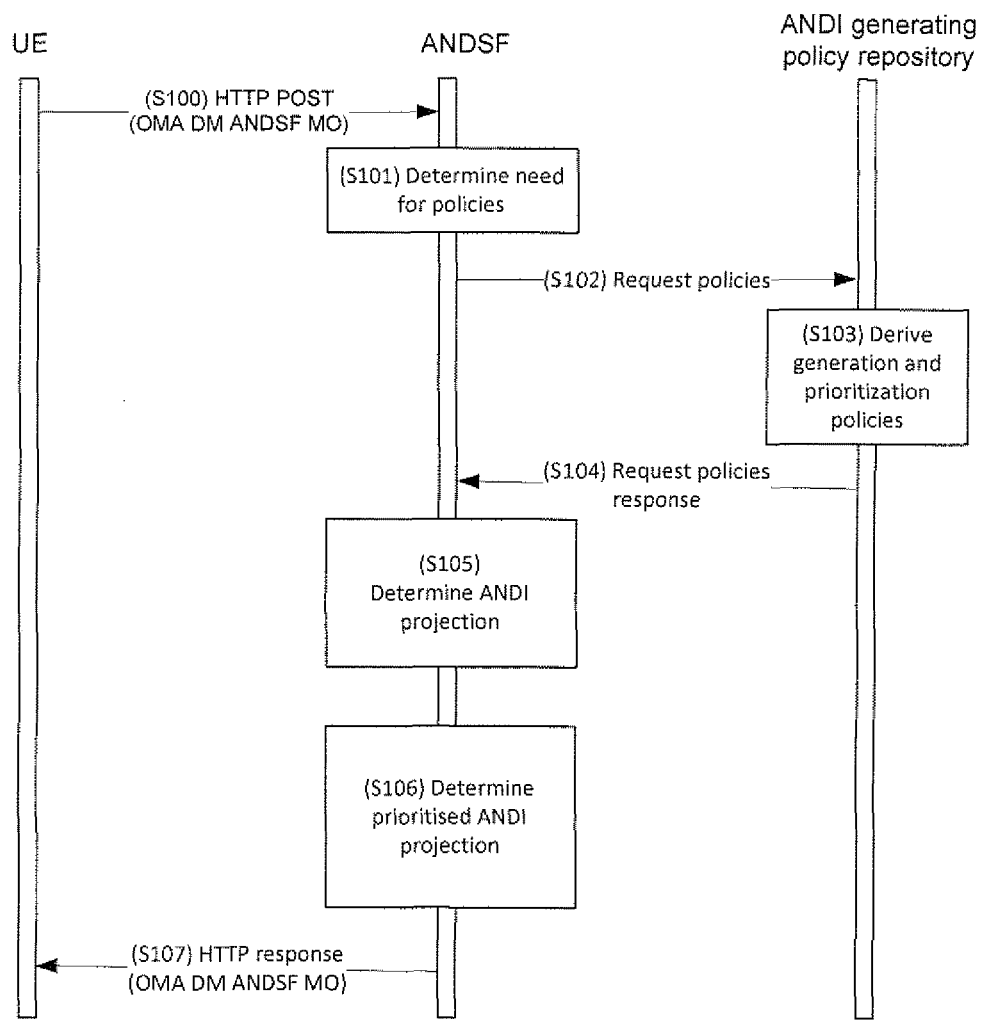
FIG. 5 shows the signalling flow between the UE, ANDSF and the ANDI generation policy repository in the first embodiment.

FIG. 5 illustrates an example of the signalling flow that can occur in the system of FIG. 1.

In step S100 of FIG. 5, the UE 180 issues a HTTP POST request towards the ANDSF component 150, containing an OMA DM ANDSF MO with location information. Such request contains information to univocally identify the subscriber, for instance, by means of the IMEI. In step S101, the ANDSF component 150, upon the reception of the request, determines whether or not it needs to get an ANDI generation policy or an ANDI prioritisation policy. In the case that it does not need to do so, because there are already policies in place that are valid, the execution flow continues in step S105. Otherwise, the ANDSF component 150 requests the needed policies (in step S102) from the ANDI generating repository 110, by sending a "Request policies" message. The ANDSF component 150 can generally request at least one ANDI generation policy, one or more prioritisation policies, or both. The request also indicates to which subscriber the policies are requested for (identified, for instance, by the IMEI).

In step S103, the ANDI generating policy repository 120 derives, using the association component 130 and the identification component 140, the appropriate one or more ANDI generating policies, one or more prioritisation policies, or both. Then, in step S104, the ANDI generating policy repository 120 sends the identified one or more policies to the ANDSF component 150, in a "Request policies response" message.

The ANDSF component 150 uses the received ANDI generation policy and the location information provided by the UE 180 to compute the ANDI projection in step S105. This projection contains the union of all the ANDI layers identified by response of the ANDI generation policy repository, filtered by the location where the UE 180 is reported to be located. Next, the ANDSF component 150 combines and uses the prioritisation policy to compute the prioritised ANDI projection (step S106). Finally, the prioritised ANDI projection is used to create an ANDSF Management Object containing the Access Network Discovery Information, ISMPs and/or ISRPs, which is returned to the UE in step S107.

For illustrative purposes, further embodiments of the present invention are described below, with reference to some nodes implementing functional entities of a telecommunications system comprising a "Policy and Charging Control" (PCC) architecture, which is disclosed in 3GPP specification TS 23.203 (v11.2.0, June 2011) with regard to EPC networks.

Two different and alternative architectures can be used. The first uses the Subscriber Profile Repository (SPR) or the User Data Repository (UDR) as a policy repository. The second uses the Policy and Charging Rules Function (PCRF) and the SPR as a policy repository.

More specifically, there are at least three alternatives for where the policy repository function can be implemented, namely:

(1) in the UDR, with the UDR selecting the applicable policies on a per user basis, and retrieving the relevant policies stored in the UDR itself. In this case, the ANDSF component implements the Ud interface towards the UDR;

(2) in the SPR, with the ANDSF component selecting the applicable policies on a per user basis, and fetching the relevant policies in the SPR, by means of the Sp interface; and (3) in the PCRF, with the PCRF selecting the applicable policies on a per user basis, and fetching the relevant policies in the SPR.

These alternatives will now be described in detail by way of the second, third and fourth embodiments of the present invention.

[Second Embodiment]

A system for generating user-specific ANDI according to a second embodiment of the present invention will now be described with reference to FIGS. 6A and 6B.

Figure 6A:
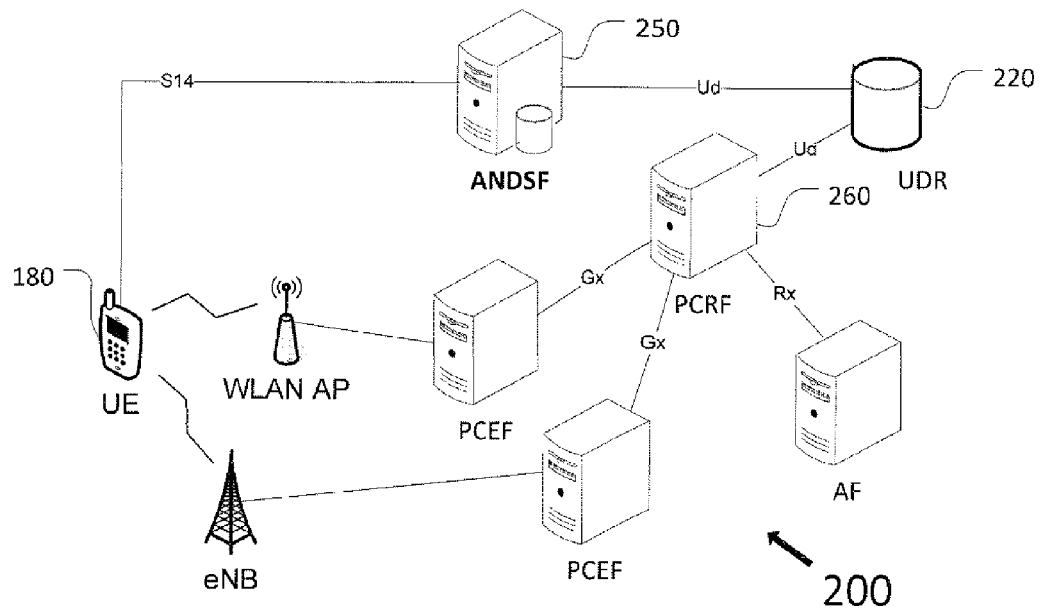
FIG. 6A shows the components of a system for generating ANDI according to a second embodiment of the present invention and the interfaces between the components.
Figure 6B:
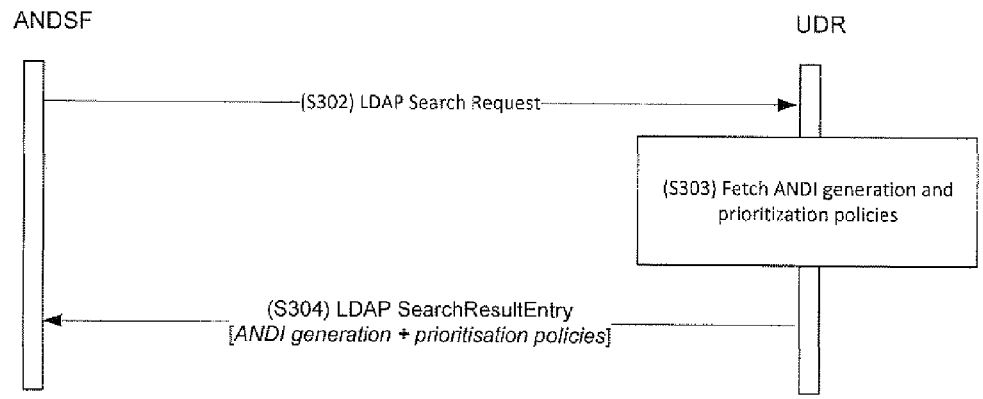
FIG. 6B shows a signalling flow between the ANDSF and the UDR in the second embodiment.

As shown in FIG. 6A, the system 200 of the present embodiment includes an ANDSF component in the form of an ANDSF server 250, which interacts with the UE 180 over the usual S14 interface. However, in the present embodiment, the ANDSF server 250 is configured to also communicate with a UDR 220, which comprises an ANDI generating policy repository 120, a prioritisation policy repository 160 and an association component 130, as have been described above in connection with the first embodiment. The ANDSF server 250 communicates with the UDR 220 over the Ud reference point, which is based in LDAP. In the present embodiment, the ANDSF server 250 functions as a front-end to the UDR 220.

An advantage of this second embodiment consists of having all the subscriber-specific data stored in a single repository, namely, the UDR. The UDR stores all the subscriber data in the network related to any service, not only policy data used by the ANDSF. This simplifies operation and maintenance of the network and reduces the chances to have duplicated data, perhaps even non-synchronized duplicated data, should this data be used by different nodes in the network. Additionally, it allows different nodes to read and write the same data, removing the need for implement an interface towards each node to which communication is required.

FIG. 6A also shows the system 200 to include a PCRF component 260 in communication with the UDR 220, as well as two Policy and Charging Enforcement function (PCEF) components, which are each arranged to communicate with the PCRF 260 via respective Gx interfaces. The PCRF 260 also interacts with an Application Function, AF, via an Rx interface. An AF is a node of a telecommunications system implementing processing and communication means for offering a service to a UE, which may require interacting from the AF with a PCRF so that the PCRF can establish accordingly the necessary policies to be enforced/applied to data flows from/to said UE with regard to e.g. allowed access networks, quality of service and/or charging. One example of an AF is a server node implementing a "Proxy-Call Session Control Function", P-CSCF, of a telecommunications system comprising an "IP Multimedia Subsystem", INS.

In the present embodiment, the ANDSF server 250 is arranged to retrieve at least one ANDI generating policy and at least one prioritisation policy, which has been identified by the identification component 140, from the policy repositories in the UDR 220, and apply the at least one retrieved policy to the ANDI data entries stored in the ANDI repository 110 to generate the ANDI for transmission to the UE 180. In the present embodiment, the identification component may form part of the UDR 220 or the ANDSF server 250.

The signalling flow in system 200 will now be described with reference to FIG. 6B.

The signalling starts with step S302, which is equivalent to step S102 in FIG. 5. Steps S303 and S304 are equivalent to steps S103 and S104, respectively, in FIG. 5.

In step S302, the ANDSF server 250 sends an LDAP Search Request message to the UDR 220. The UDR 220 fetches the ANDI generation and prioritisation policies in step S303, and replies with the requested information in an LDAP Search Result Entry message in step S304.

[Third Embodiment]

A system for generating user-specific ANDI according to a third embodiment of the present invention will now be described with reference to FIGS. 7A and 7B.

Figure 7A:
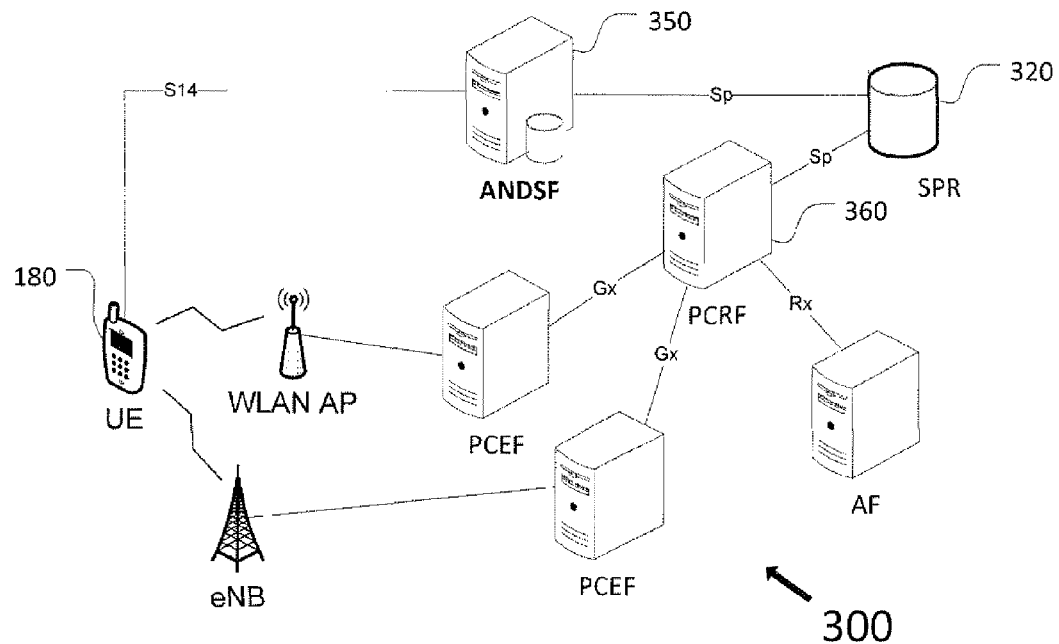
FIG. 7A shows the components of a system for generating ANDI according to a third embodiment of the present invention and the interfaces between the components.
Figure 7B:
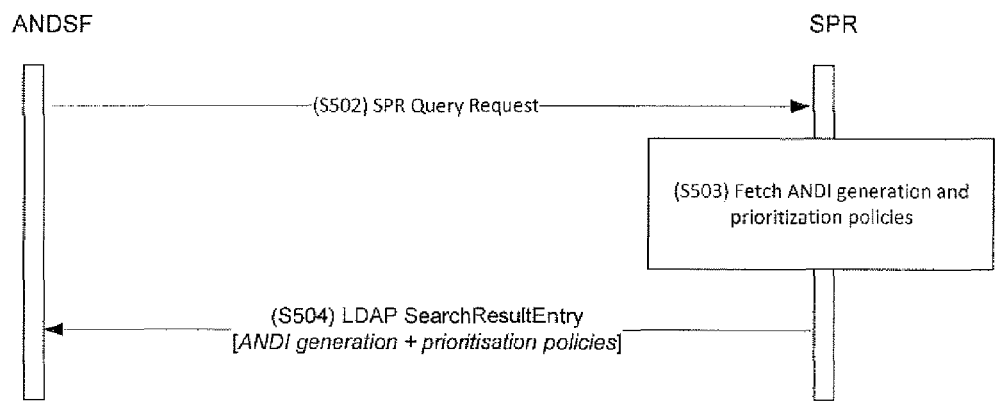
FIG. 7B shows a signalling flow between the ANDSF and the SPR in the third embodiment.

As shown in FIG. 7A, the system 300 of the present embodiment includes an ANDSF server 350, which interacts with the UE 180 over the usual S14 interface. The ANDSF component 150 described above is provided in the form of an ANDSF server 350 in the present embodiment, which comprises the above-described association and identification components.

In the present embodiment, the ANDSF server 350 is configured to also communicate with a SPR 320, which provides subscriber-specific data to the PCRF component 360 used in policy evaluations. The SPR 320 comprises an ANDI generating policy repository 120 and a prioritisation policy repository 160, as have been described above in connection with the first embodiment. The ANDSF server 350 communicates with the SPR 320 over the Sp reference point, which is based in LDAP. It is also possible for the SPR 320 to be a UDR front-end.

This embodiment has economical advantages in deployment scenarios where the telecommunications network of an operator already implements an SPA 320 database as a data repository storing subscriber data of a plurality of users of a network comprising a PCC architecture (e.g. as disclosed in the aforementioned 3GPP specification TS 23.203), which can be enhanced to store ANDI generating policies and prioritization policies.

As shown in FIG. 7A, the system 300 also includes a PORT 360 in communication with the SPR 320, as well as two PCEFs, which are each arranged to communicate with the PORT 360 via respective Gx interfaces, as in the second embodiment. Additionally, the PORT 360 interacts with an AF over an Rx interface.

In the present embodiment, the ANDSF server 350 is arranged to retrieve at least one ANDI generating policy and at least one prioritisation policy, which has been identified by the identification component 140, from the policy repositories in the SPR 320, and apply the at least one retrieved policy to the ANDI data entries stored in the ANDI repository 110 to generate the ANDI for transmission to the UE 180.

The signalling flow in system 300 will now be described with reference to FIG. 7B.

The signalling starts with step S502, which is equivalent to step S102 in FIG. 5. Steps S503 and S504 are equivalent to steps S103 and S104, respectively, in FIG. 5.

In step S502, the ANDSF server 350 sends an SPR Query Request message to the SPR 320. In step S503, the SPR 320 fetches the ANDI generation and prioritization policies identified by the ANDSF server 350, and then replies with the requested information in an SPR Query Response message in step S504.

[Fourth Embodiment]

The fourth embodiment of the present invention will now be described with reference to FIGS. 8A and 8B. A variant of the fourth embodiment is also described below with reference to FIG. 8C.

Figure 8A:
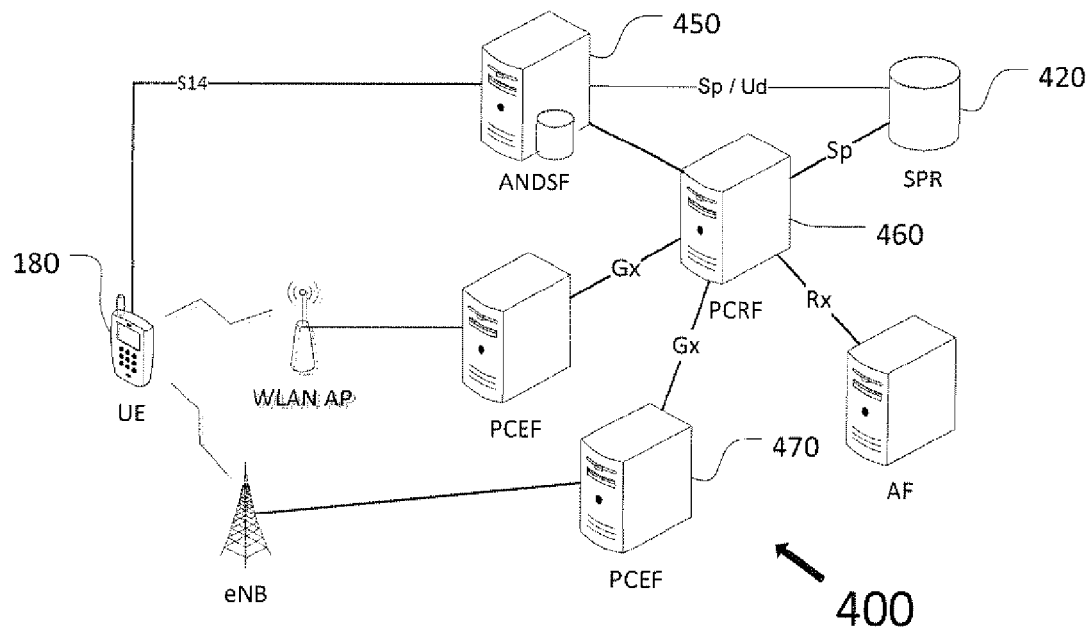
FIG. 8A shows the components of a system for generating ANDI according to a fourth embodiment of the present invention and the interfaces between the components.

FIG. 8A illustrates a system architecture in which a PCRF and SPR function as the policy repository. More specifically, as shown in FIG. 8A, the system 400 of the present embodiment includes an ANDSF component in the form of an ANDSF server 450, which interacts with the UE 180 over the usual S14 interface. The system 400 also includes a PCRF component 460 which is arranged to communicate with a SPR 420 as well as with two PCEFs and an AF. Each of the PCEFs is arranged to communicate with the PCRF component 460 via a Gx interface, as in the second and third embodiments. The ANDSF server 450, besides its standard S14 interface towards the UE 180, implements an interface to the PCRF component 460. This interface is not present in existing ANDSF implementations and is used to request the ANDI generation policies and/or prioritisation policies.

In the present embodiment, the SPR 420 comprises the ANDI generating policy repository 120 and the prioritisation policy repository 160 as described above in connection with the first embodiment. The PCRF 460 comprises the above-described association component 130 and identification component 140, and is configured to retrieve the identified one or more policies from the policy repositories in the SPR 420. The PCRF component 460 retrieves subscriber data from the SPR 420 by means of the Sp reference point, and uses it to derive the appropriate ANDI generation and prioritisation policy. Thus, the PCRF component 460 dictates both access network information layer selection policies and prioritisation policies.

Aside from the operation and derived signalling scenario described with reference to FIG. 5 of the first embodiment, which is referred to herein as pull mode, the PCRF and SPR acting as a policy repository allows for another operation and signalling scenario, which is referred to herein as push mode. In the present embodiment, where the PCRF 460 functions as the policy repository, the generation of ANDI generation and prioritisation policies can be triggered:
1) whenever the ANDSF server 450 receives a request from the UE 180 and it does not have either access network information layer selection policies or prioritisation policies, or both, or any of them are outdated. This corresponds to pull mode operation.
2) whenever the PCRF component 460 determines that the ANDI generation policies or prioritisation policies installed in the ANDSF server 460 for a given UE user must be updated, for instance due to network events reported from the PCEFs or application events reported from an AF, or even administratively. This scenario corresponds to push mode operation.

The signalling flow in system 400 in pull mode operation will now be described with reference to FIG. 8B.

Figure 8B:
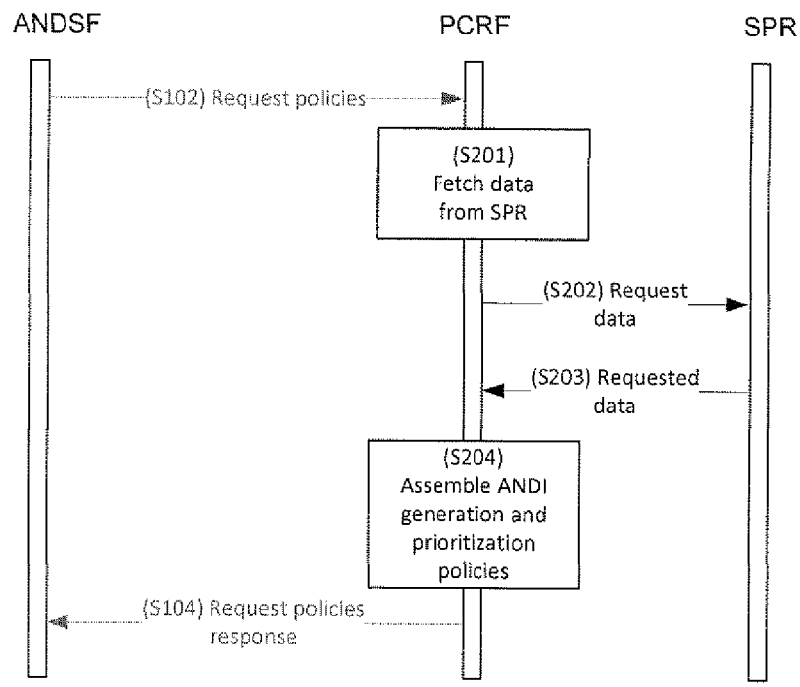
FIG. 8B shows the signalling flow between the ANDSF, PCRF and the SPR in the fourth embodiment when operating in a pull mode.

FIG. 8B expands the step S103 in FIG. 5. The preceding and following steps from FIG. 5 are depicted in grey, in order to make it easier to understand where the PCRF-specific signalling fits into the overall signalling sequence.

The signalling starts with the ANDSF server 450 requesting ANDI generation and prioritisation policies from the PCRF component 460, by issuing a "Request policies" message as already described (step S102 in FIG. 5). As with the above embodiments, the request may only include a request for one or more ANDI generation policies.

In step S201, the PCRF 460 determines whether it needs to fetch user-related data from the SPR 420 or not. The SPR 420 contains, among other data, ANDI generation policies comprising the list of access network information layers identifiers (ANG-IDs) that are applicable to this user, depending on, e.g., the groups the user belongs to. The PCRF 460 requests the required data to the SPR in step S202, and the SPR 420 returns the requested data in step S203. The PCRF uses these data from the SPR 420 and any other data in the PCRF 460 that is relevant for policy decisions. In step S204, the PCRF 460 assembles the user-specific ANDI generation and prioritisation policies. Finally, the DOFF component 460 sends these in a "Request policies response" message to the ANDSF server 450 as already described (in step S104 in FIG. 5).

[Variant of the Fourth Embodiment]

Figure 8C:
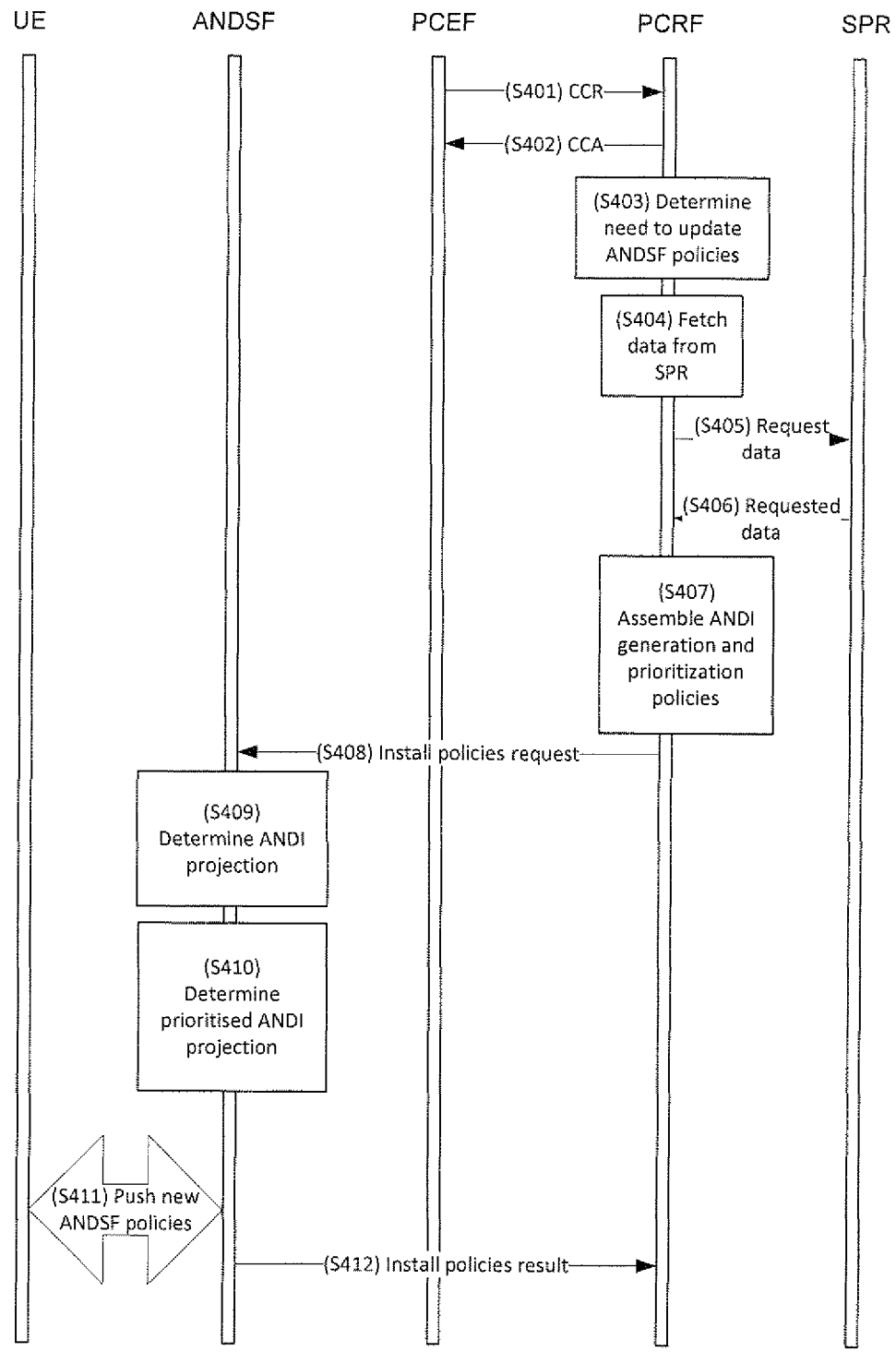
FIG. 8C shows a signalling flow between the UE, ANDSF, PCEF, PCRF and the SPR in a variant of the fourth embodiment.

A variant of the fourth embodiment, in which the user-specific ANDI is pushed to the UE 180, will now be described with reference to FIG. 8C.

In step S401, upon establishment of a new bearer, or whenever a modification of the established bearers occurs, the PCEF 470 sends a Diameter CCR message to the PCRF 460 requesting PCC rules. The PCRF, as part of its regular operation, derives PCC rules and requests the installation of such rules to the PCEF 470 in step S402. The installation of such PCC rules is omitted in the diagram.

In step S403, the PCRF 460 determines whether as a result of the new bearer setup or the modification of the existing bearer it needs to update the ANDSF-related policies or not. Then, in step S404, the PCRF 460 determines whether it needs to fetch data from the SPR 420 or not. The PCRF 460 requests the required data to the SPR 420 in step S405 and the SPR 420 returns the requested data in step S406. In step S407, the PCRF 460 uses the data from the SPR data and any other data in the PCRF 460 that is relevant for policy decisions and assembles access network information layer selection policies and, if necessary, also one or more prioritisation policies. In step S400, the PCRF 460 requests the ANDSF server 450 to install the policies to the relevant subscriber (who may be identified by the IMEI, for example). Then, in step S409, the ANDSF server 450 computes the ANDI projection. This projection contains the union of all the ANDI layers identified by the PCRF 460, filtered by the location where the UE 180 reported itself to be located. Next, in step S410, the ANDSF server 450 uses the prioritisation policies to compute the prioritised ANDI projection. The prioritised ANDI projection is encoded as an ANDSF Management Object set of policies. The ANDSF server 450 pushes the new ANDSF policies in step S411, by using regular push ANDSF procedures. Then the ANDSF server 450 acknowledges to the PCRF 460 the reception of the policies in step S412.

The present embodiment thus features a new interface defined between the PCRF 460 and the ANDSF 450. This interface provides means for:
a) The ANDSF 450 to request ANDI generation policies to the PCRF 460, and the PCRF 460 to return ANDI generation policies, as well as prioritisation information. This corresponds to steps S102 and S104, respectively, in FIG. 8B.
b) The PCRF 40 to push to the ANDSF 450 new ANDI generation policies together with prioritisation information, as well as its corresponding acknowledgment. This corresponds to steps S408 and S412, respectively, in FIG. 8C.

Implementation of this new interface can be based on the Diameter protocol, specified in RFC 3588. New Attribute-Value-Pairs are defined to convey the required information, such as ANDI generation policies, which contain a list of access network group identifiers (ANG-ID) that can be sorted in priority order or unordered. This is implemented with a new AVP named Access-Network-Layer-Policy, and is of type Grouped. It has this definition:

Access-Network-Generation-Policy::=*[Group-Identifier]

In this expression, "Group-Identifier" is of type Octet-String, and represents an ANG-ID as described herein above.

Furthermore, the new Attribute-Value-Pairs can be defined to convey prioritisation information. This may contains a list of pointers to prioritisation rules which are installed in the prioritisation policy repository 160. The ANDSF component 150 may apply the selected rules when determining the prioritised ANDI projection. This may be implemented with a new AVP named "Prioritisation-Policy", and is of type Grouped. It has this definition:

Prioritization-Policy::=*[Prio-Policy-Identifier]

The Prio-Policy-Identifier is of type OctetString, and represents a pointer to a prioritisation policy provisioned in the prioritisation policy repository 160.

The ANDSF may be able to cache information pertaining to a given user, so that requests initiated by the user (pull mode) are answered immediately, based on the information cached in a previous interaction with the PCRF. Similarly, information pushed from the PCRF to the ANDSF may also feed the ANDSF local cache, in addition to pushing the information to the UE.

[Modifications and Variations]

Many modifications and variations can be made to the embodiments described above.

For example, the ordering of the process steps in the flow diagram of FIG. 4 may be varied in any suitable and desirable way. Thus, steps S10 to S40 may be provided in any sequence, while steps S70 and S80 may be interchanged, for instance.

Furthermore, in the first embodiment, a prioritised ANDI projection comprising ANDI and an ISMP is generated and transmitted to the UE 180 by the ANDSF component 150. However, the ANDI projection may alternatively comprise the user- and location-specific ANDI together with an ISRP that is provided instead of, or in addition to, the ISMP.

The invention claimed is:

1. A system for generating by an Access Network Discovery and Selection Function (ANDSF) access network discovery information (ANDI) for transmission to a User Equipment (UE) of a network subscriber, the system comprising:
   an ANDI repository storing for each of a plurality of access networks an ANDI data entry comprising ANDI for the respective access network, each of the ANDI data entries being stored in association with:
   an access technology type identifier identifying an access technology type of the respective access network;
   a location identifier associated with a location of the respective access network; and
   an access network group identifier identifying a group of a plurality of groups of access networks, to which group the respective access network belongs;
   a Subscription Profile Repository (SPR) comprising an ANDI generating policy repository storing a plurality of ANDI generating policies, each said policy identifying at least one of the groups of access networks for use in generating, from the ANDI data entries in the ANDI repository, the ANDI for transmission to the UE;
   a Policy and Charging Rules Function (PCRF) component comprising:
   an association component configured to associate each of a plurality of network subscriber identifiers with at least one of the ANDI generating policies stored in the ANDI generating policy repository;
   an identification component configured to identify at least one ANDI generating policy corresponding to a network subscriber identifier associated with the UE;
   the PCRF component is configured to retrieve the at least one identified ANDI generating policy from the ANDI generating policy repository in the SPR; and
   an ANDSF component configured to:
   receive from the UE both a subscribes identifier associated with the UE and a request for ANDI; and
   transmit to the PCRF component a request for at least one ANDI generating policy corresponding to the network subscriber identifier;
   apply the at least one retrieved ANDI generating policy to the ANDI data entries stored in the ANDI repository to generate the ANDI for transmission to the UE; and
   send the generated ANDI to the UE; and
   the PCRF component is further configured to respond to said request by:
   identifying the at least one ANDI generating policy corresponding to the network subscriber identifier;
   retrieving the at least one identified ANDI generating policy from the ANDI generating policy repository in the SPR; and
   sending the at least one retrieved ANDI generating policy to the ANDSF component.

2. The system of claim 1, wherein:
   each group of at least one access network comprises at least one access network to which a set of network subscribers are granted access; and
   for each group of at least one access network, the set of network subscribers granted access to the at least one access network in that group is determined according to a network subscriber-based criterion that differs from a network subscriber-based criterion used to determine the set of network subscribers that are granted access to the at least one access network in any other of the groups of access networks.

3. The system of claim 2, wherein the groups of access networks comprise:
   a group of at least one first access network, to which access is granted to all network subscribers; and
   at least one group of at least one second access network, to which access is granted only to a subset of all network subscribers.

4. The system of claim 3, wherein the at least one group of at least one second access network comprises at least one of:
   a group of at least one service provider access network, to which access is granted only to authorized subscribers of a network service provider;
   a group of at least one corporate access network, to which access is granted only to users authorized by a corporate body; and
   a group of at least one private access network, to which access is granted only to at least one member of a household.

5. The system of claim 3, further comprising a policy Charging and Enforcement Function (PCEF) component configured to:
   cause the PCRF component to identify the at least one ANDS generating policy corresponding to a network subscriber identifier associated with the UE;
   retrieve the at least one identified ANDI generating policy from the ANDI generating policy repository in the SPR; and
   send the at least one retrieved ANDI generating policy to the ANDSF component.

6. The system of claim 2, further comprising a policy Charging and Enforcement Function (PCEF) component configured to:
   cause the PCRF component to identify the at least one ANDI generating policy corresponding to a network subscriber identifier associated with the UE;
   retrieve the at least one identified ANDI generating policy from the ANDI generating policy repository in the SPR; and
   send the at least one retrieved ANDI generating policy to the ANDSF component.

7. The system of claim 2, further comprising a prioritization policy repository storing a plurality of prioritization policies for use by the ANDSF component to determine an order in which the UE is to attempt connection to access networks identified in the generated ANDI when the ANDSF component generates at east one of an inter-System Mobility Policy (ISMP) and an Inter-System Routing Policy (ISRP) for transmission to the UE, wherein:
   the association component is further configured to associate each of the plurality of network subscriber identifiers with at least one of the prioritization policies;

the identification component is further configured to identify at least one prioritization policy corresponding to a network subscriber identifier associated with the UE; and the ANDSF component is further configured to generate at least one of the ISMP and the ISRP using the identified at least one prioritization policy.

8. The system of claim 1, further comprising:

a policy Charging and Enforcement Function (PCEF) component configured to:

cause the PCRF component to identify the at least one ANDI generating policy corresponding to a network subscriber identifier associated with the UE;

retrieve the at least one identified ANDI generating pokey from the ANDI generating policy repository in the SPR; and send the at least one retrieved ANDI generating policy to the ANDSF component.

9. The system of claim 1, further comprising a prioritization pokey repository storing a plurality of prioritization policies for use by the ANDSF component to determine an order in which the UE is to attempt connection to access networks identified in the generated ANDI when the ANDSF component generates at least one of an Inter-System Mobility Policy (ISMP) and an Inter-System Routing Policy (ISRP) for transmission to the UE, wherein:

the association component is further configured to associate each of the plurality of network subscriber identifiers with at least one of the prioritization policies;

the identification component is further configured to identify at least one prioritization policy corresponding to a network subscriber identifier associated with the UE; and the ANDSF component is further configured to generate at least one of the ISMP and the ISRP using the identified at least one prioritization policy.

10. A method of generating by an Access Network Discovery and Selection Function (ANDSF) access network discovery information (ANDI) for transmission to a User Equipment (UE) of a network subscriber, the method comprising:

storing in an ANDI repository for each of a plurality of access networks an ANDI data entry comprising ANDI for the respective access network, each of the ANDI data entries being stored in association with:

an access technology type identifier identifying an access technology type of the respective access network;

a location identifier associated with a location of the respective access network; and an access network group identifier identifying a group of a plurality of groups of access networks, to which group the respective access network belongs;

storing a plurality of ANDI generating policies in a Subscription Profile Repository (SPR), each said policy identifying at least one of the groups of access networks to be used in generating, from the ANDI data entries in the ANDI repository, the ANDI for transmission to the UE;

associating, by a Policy and Charging Rules Function (PCRF), each of a plurality of network subscriber identifiers with at least one of the ANDI generating policies stored in the SPR;

the PCRF identifying the at least one ANDI generating policy corresponding to a network subscriber identifier associated with the UE, and retrieving the at least one identified ANDI generating policy from the SPR; and the ANDSF applying the at least one retrieved ANDI generating policy to the ANDI data entries stored in the ANDI repository to generate the ANDI for transmission to the UE and sending the generated ANDI to the UE;

the ANDSF receiving from the LJE both a network subscriber identifier associated with the UE and a request for ANDI;

the ANDSF sending to the PCRF a request for at least one ANDI generating policy corresponding to the network subscriber identifier; and the PCRF responding to said request by:

identifying the at least one ANDI generating policy corresponding to the network subscriber identifier;

retrieving the at least one identified ANDI generating policy from the SPR; and sending the at least one retrieved ANDI generating policy to the ANDSF.

11. The method of claim 10, wherein;

each group of access networks comprises at least one access network to which a set of network subscribers are granted access; and for each group of access networks, the set of network subscribers granted access to the at least one access network in that group is determined according to a network subscriber-based criterion that differs from a network subscriber-based criterion used to determine the set of network subscribers that are granted access to the at least one access network in any other of the groups of access networks.

12. The method of claim 11, wherein the groups of access networks comprise:

a group of at least one first access network, to which access is granted to all network subscribers; and at least one group of at least one second access network, to which access is granted only to a subset of all network subscribers.

13. The method of claim 12, wherein the at least one group of at least one second access network comprises at least one of:

a group of at least one service provider access network, to which access is granted only to authorized subscribers of a network service provider;

a group of at least one corporate access network, to which access is granted only to users authorized by a corporate body; and a group of at least one private access network, to which access is granted only to at east one member of a household.

14. The method of claim 11, further comprising:

the ANDSF receiving from the UE both a network subscriber identifier associated with the UE and a request for ANDI;

the ANDSF sending to the PCRF a request for at least one ANDI generating policy corresponding to the network subscriber identifier; and the PCRF responding to said request by:

identifying the at least one ANDI generating policy corresponding to the network subscriber identifier;

retrieving the at least one identified ANDI generating policy from the SPR; and sending the at least one retrieved ANDS generating policy to the ANDSF.

15. The method of claim 11, further comprising:

storing a plurality of prioritization policies for use by the ANDSF to determine an order in which the UE is to attempt connection to access networks identified in the generated ANDI when the ANDSF generates at least one of an inter-System Mobility Policy (ISMP) and an inter-System Routing Policy (ISRP) for transmission to the UE;

associating each of the plurality of network subscriber identifiers with at least one of the prioritization policies;

identifying at least one prioritization policy corresponding to a network subscriber identifier associated with the UE; and the ANDSF generating at least one of the ISMP and the ISRP using the identified at east one prioritization policy.

16. The method of claim 10, further comprising:

a policy Charging and Enforcement Function (PCEF), upon establishment of one of a new bearer and a modification of an existing bearer, causing the PCRF to:

identify at east one ANDI generating policy corresponding to a network subscriber identifier associated with the UE;

retrieve the at least one identified ANDI generating policy from the SPR; and send the at least one retrieved ANDI generating policy to the ANDSF.

17. The method of claim 10, further comprising:

storing a plurality of prioritization policies for use by the ANDSF to determine an order in which the UE is to attempt connection to access networks identified in the generated ANDI when the ANDSF generates at least one of an Inter-System Mobility Policy (ISMP) and an Inter-System Routing Policy (ISRP) for transmission to the UE;

associating each of the plurality of network subscriber identifiers with at least one of the prioritization polices;

identifying at least one prioritization policy corresponding to a network subscriber identifier associated with the UE; and the ANDSF generating at least one of the ISMP and the ISRP using the identified at least one prioritization policy.

18. The method of claim 10, further comprising a policy Charging and Enforcement Function (PCEF), upon establishment of one of a new bearer and a modification of an existing bearer, causing the PCRF to:

identify at least one ANDI generating policy corresponding to a network subscriber identifier associated with the UE;

retrieve the at least one identified ANDI generating policy from the SPR; and send the at least one retrieved ANDI generating policy to the ANDSF.

* * * * *